United States Patent
Waltho

(10) Patent No.: US 6,771,931 B2
(45) Date of Patent: Aug. 3, 2004

(54) METHOD AND AN APPARATUS FOR PASSIVE INTERFERENCE CANCELLATION

(75) Inventor: Alan E. Waltho, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 561 days.

(21) Appl. No.: 09/884,569

(22) Filed: Jun. 18, 2001

(65) Prior Publication Data

US 2002/0193071 A1 Dec. 19, 2002

(51) Int. Cl.⁷ .................................. H04B 1/10
(52) U.S. Cl. ...................... 455/24; 455/501; 455/78; 375/148
(58) Field of Search ................. 455/24, 500, 501, 455/502, 63.1, 78; 375/132, 144, 148

(56) References Cited

U.S. PATENT DOCUMENTS 5,691,978 A    11/1997   Kenworthy

FOREIGN PATENT DOCUMENTS

| EP | 0 905 914 A2 | 3/1999 |
| EP | 0 957 587 A2 | 11/1999 |
| GB | 2 329 554 A | 3/1999 |
| WO | US 02/18195 | 9/2002 |

Primary Examiner—Nick Corsaro
(74) Attorney, Agent, or Firm—Blakely, Sokoloff, Taylor & Zafman LLP

(57) ABSTRACT

A method and an apparatus for passive interference cancellation are provided. The apparatus includes a first and second radio operating on a same frequency band, a first and second coupler, and a first phase shifter. The first radio includes a first radio transceiver and a first radio antennae. The second radio includes a second radio antennae located a predetermined distance from the first radio antennae. A first coupler and second coupler are adjusted according to a coupling loss between the antennas. The first radio transceiver transmits a first signal. The first signal is divided by the first coupler to a first portion and a second portion. The first portion moves through the first radio antennae and is received by the second radio antennae. The second portion moves through the first phase shifter. Both portions of the first signal meet and cancel to achieve a specified isolation between the radios.

46 Claims, 4 Drawing Sheets

METHOD AND AN APPARATUS FOR PASSIVE INTERFERENCE CANCELLATION

FIELD OF THE INVENTION

The present invention relates generally to radio frequency architecture, and more particularly, to passive interference cancellation.

BACKGROUND

In general, extraneous energy, from natural or man-made sources, that impedes the reception of desired signals is termed as interference. Interference may involve a radio emission from another transmitter at approximately the same frequency, or having a harmonic or spurious frequency approximately the same as, another emission of interest to a given recipient. In both situations, the reception of the desired signal by the intended recipient may be impeded.

Several interference cancellation techniques currently exist to reduce the effects of interference. One such technique is an interference filter. An interference filter reflects or absorbs one or more spectral bands or lines and transmits others, while maintaining a nearly zero coefficient of absorption for all wavelengths of interest. An interference filter may be high-pass, low-pass, or bandpass. Interference filters are wavelength-selective. However, an interference filter may only be used if the interference signal and the desired signal are at different frequencies. Accordingly, an interference filter would not be feasible in a situation where two radios are operating at the same frequency band.

Another technique that may be used in reducing interference is blanking the input to the receiver during the time the interference is present. However, blanking involves blocking all signals so that the receiver may not receive any signals. Accordingly, this technique is overreaching.

Yet another technique that may be used in reducing interference is a band-reject filter. A band-reject filter attenuates, usually to very low levels, all frequencies between two non-zero, finite limits and passes all frequencies not within the limits. A band-reject filter may be designed to stop the interference but will also reject the desired signal if it is in the same frequency band. Accordingly, this technique would not be feasible when two radios are operating at the same frequency band.

BRIEF DESCRIPTION OF THE DRAWINGS

The present invention is illustrated by way of example, and not limitation, in the figures of the accompanying drawings in which.

DETAILED DESCRIPTION

A method and an apparatus for passive interference cancellation are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. Several embodiments are described herein. However, there are other ways that would be apparent to one skilled in the art that may be practiced without specific details.

Figure 1:
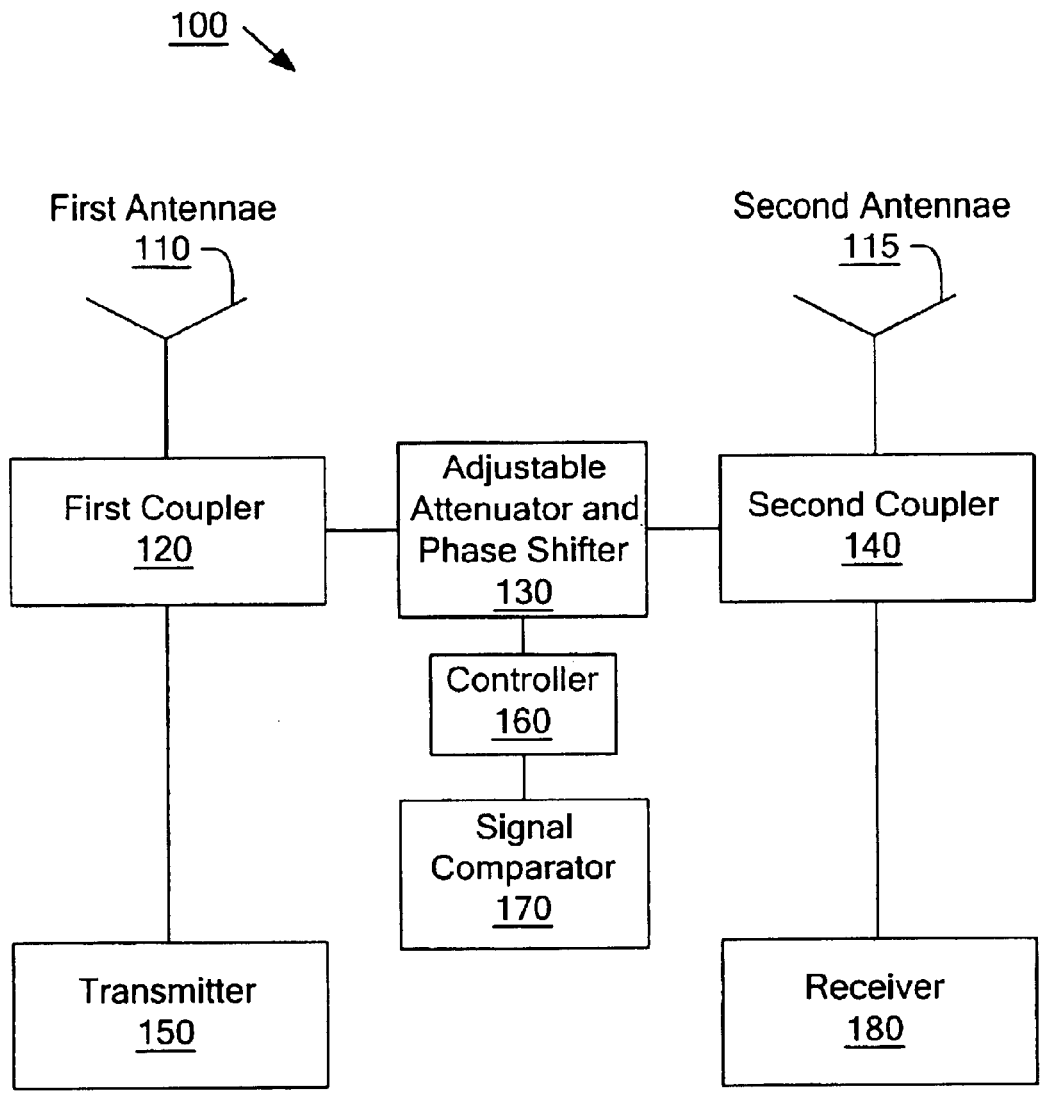
FIG. 1 illustrates one embodiment of an active cancellation system.

FIG. 1 illustrates one embodiment of an active interference cancellation system 100. In this system 100, the signals received by a receiver 180 via a second antennae 115 are actively monitored for interference. A transmitter 150 sends out a signal (not shown). Because of the coupling between a first antennae 110 and the second antennae 115, the receiver 180 receives a mixture of any desired signals coming to the receiver 180 through the second antennae 115 and the signal from the transmitter 150 (interfering signal). The first coupler 120 is used to obtain a small sample of the transmitted signal. Accordingly, the signals sent by the transmitter 150 are detected by the signal comparator 170 and compared with the signal received from the antennae 115. The controller 160 is coupled to and controls the adjustable attenuator and phase shifter 130 so that the interfering signal may be canceled out by a cancellation signal equal in amplitude and opposite in phase of the interference signal. The cancellation signal is injected into the transmission line of the receiver 180 by a second coupler 140. Accordingly, the interfering signal does not disrupt any desirable signals received by the receiver 180. However, the system 100 shown in FIG. 1 is actively monitoring and adjusting for any interfering signals rather than passively canceling interference from the transmitter 150.

Figure 2:
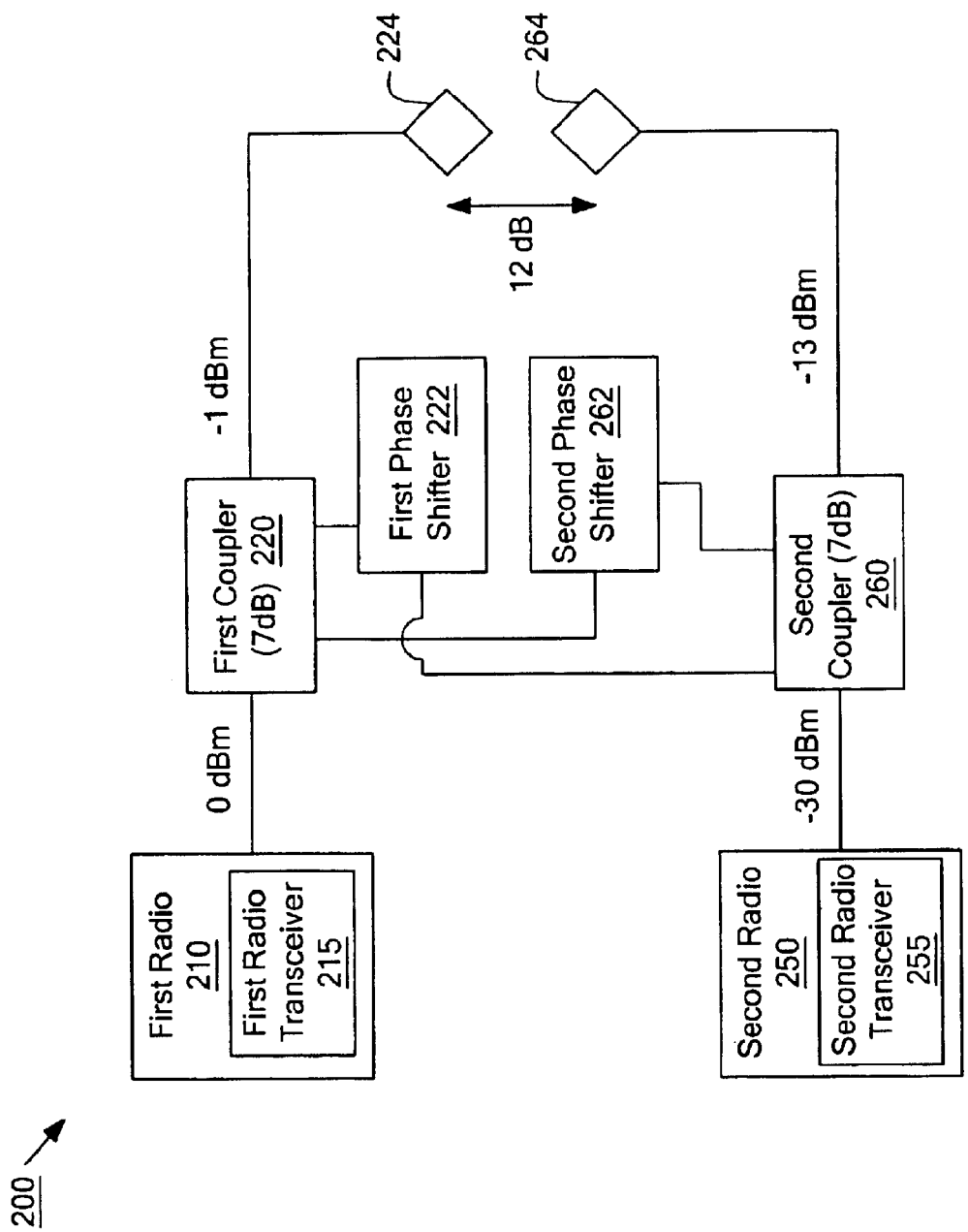
FIG. 2 illustrates one embodiment of a passive cancellation system.

FIG. 2 illustrates one embodiment of a passive interference cancellation system 200. A first radio 210 and a second radio 250 operate on a same frequency band. In one embodiment, the first and second radios 210 and 250 may be in one device, such as a notebook computer. Referring to FIG. 2, the first radio 210 includes a first radio transceiver 215 and a first radio antennae 224. The second radio 250 includes a second radio transceiver 255 and a second radio antennae 264. Due to the location and operation of the second radio 250 on the same frequency band, signals transmitted by the first radio 210 result in interference to the second radio 250, and signals transmitted by the second radio 250 result in interference to the first radio 210. Accordingly, the system 200 shown in FIG. 2 uses passive interference cancellation to achieve low losses between the first and second radios 210 and 250 and their respective antennas 224 and 264 while achieving a high isolation between the first and second radio 210 and 250. In one embodiment, those low losses are less than 1 decibel (dB) while the isolation is greater than 30 dB.

In FIG. 2, the first radio 210 transmits a first signal (not shown) to a remote location via the first radio transceiver 215. In one embodiment, an example of which is shown in FIG. 2, the first signal is 0 dBm (decibels with respect to one milliwatt). The first signal is sent through a first coupler 220 that divides the first signal into a first portion and a second portion. In FIG. 2, the loss from the first coupler 220 is 1 dBm. The first portion of the first signal continues to move to the first radio antennae 224 and is sent out into free space. Indirectly, the first portion of the first signal is also received by the second radio antennae 264 and sent to a second coupler 260. The first and second radio antennas 224 and 264 are located a predetermined distance from one another. There is also a coupling loss of 12 dB between the first radio antennae 224 and the second radio antennae 265. The first and second couplers 220 and 260 are adjusted according to that coupling loss. Accordingly, in FIG. 2, the first and second couplers are 7 dB directional couplers.

The second portion of the first signal is sent through a first phase shifter 222, which changes the phase of the second portion. As the second portion and first portion of the first signal meet, the portions cancel to achieve a specified isolation between the first radio 210 and the second radio 250.

In one embodiment, the second radio 250 transmits a second signal (not shown) to a remote location via the second radio transceiver 255. The second signal is sent through the second coupler 260 that divides the second signal into a first portion and a second portion. The first portion of the second signal continues to move to the second radio antennae 264 and is sent out into free space. Indirectly, the first portion of the second signal is then received by the first radio antennae 224 and sent to the first coupler 220.

The second portion of the second signal is sent through a second phase shifter 262, which changes the phase of the second portion. As the second portion and first portion of the second signal meet, the portions cancel to achieve a specified isolation of 30 dBm between the first radio 210 and the second radio 250.

In one embodiment, the specified isolation is thirty decibels. In alternative embodiment, the specified isolation may be approximately thirty decibels depending on the isolation between the antennas 224 and 264. In one embodiment, the predetermined distance between the first and second radio antennas is determined according to the specified isolation between the first and second radios.

Figure 3:
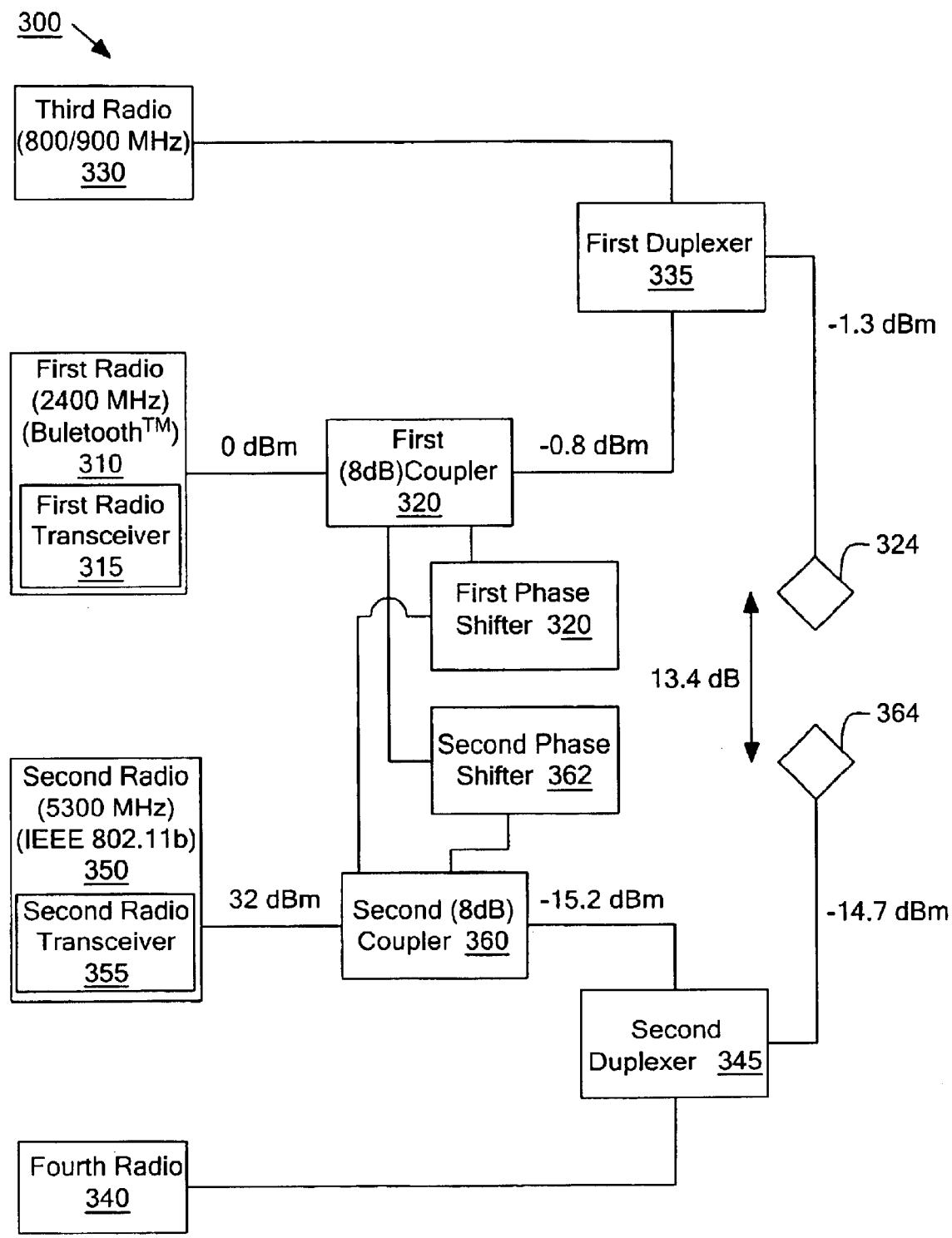
FIG. 3 illustrates an alternative embodiment of a passive cancellation system.

In one embodiment, the first and second couplers are directional couplers. A directional coupler is a transmission coupling device for separately sampling (through a known coupling loss) either the forward (incident) or the backward (reflected) wave in a transmission line. In one embodiment, the first and second couplers are bidirectional couplers. A bidirectional coupler has available terminals for sampling both directions of transmission. In one embodiment, as shown in FIG. 3, the first and second couplers 420 and 460 are 8 dB couplers. In alternative embodiments, the couplers are adjusted according to the coupling loss between the first and second radio antennae.

FIG. 3 illustrates an alternative embodiment of a passive interference cancellation system 300. The system 300 in FIG. 3 is similar to the system 200 in FIG. 2. However, in FIG. 3, a first radio 310 shares a first radio antennae 324 with a third radio 330, and a second radio 350 shares a second radio antennae 364 with a fourth radio 340.

In FIG. 3, the first radio 310 and the second radio 350 operate on a same frequency band. In one embodiment, an example of which is shown in FIG. 3, the first and second radios 310 and 350 operate at 2400 megahertz (MHz).

The first radio 310 includes a first radio transceiver 315 and a first radio antennae 324. In one embodiment, the first radio 310 uses a short-range wireless communications standard called Bluetooth™. Bluetooth™ is a protocol of a short-range (10 meter) frequency-hopping radio link between devices. A device using a Bluetooth™ standard eliminates the need for wires and cables while allowing for data and voice communication interaction between that device and another device using the Bluetooth™ standard. Bluetooth™ technology supports point to multiple point connections so that up to seven devices can be set to communicate with one controller device and with each other. This is called a piconet and several of these piconets can be established and linked together to form scatternets to allow communication among these configurations. Referring back to FIG. 3, the first radio 310 can accordingly communicate with any remote receivers in a 10 meter radius. In one embodiment, the third radio 330 also uses a Bluetooth™ communication standard.

The second radio 350 includes a second radio transceiver 355 and a second radio antennae 364. In one embodiment, the second radio uses a short-range wireless communications standard called IEEE 802.11b. The IEEE 802.11b standard is a wireless local area network (LAN) standard developed by the Institute of Electrical and Electronic Engineering (IEEE) committee in order to specify an "over the air" interface between a wireless client and a base station or access point, as well as among wireless clients. A wireless LAN (WLAN) is a data transmission system designed to provide location-independent network access between computing devices by using radio waves rather than a cable infrastructure. Accordingly, the second radio 350 may communicate with any receivers using IEEE 802.11b. In one embodiment, the fourth radio 340 also uses IEEE 802.11b communication standard.

Due to the location and operation of the second radio 350 on the same frequency band, signals transmitted from the first radio 310 result in interference to the second radio 350, and signals transmitted from the second radio 350 result in interference to the first radio 310. Accordingly, the system 300 shown in FIG. 3 uses passive interference cancellation to achieve low losses between the first and second radio transceiver 315 and 355. In one embodiment, the low losses may be less than 1 dB.

In FIG. 3, the first radio 310 transmits a first signal (not shown) to a remote location via the first radio transceiver 315. In one embodiment, an example of which is shown in FIG. 3, the first signal is 0 dBm. The first signal is sent through a first coupler 320 that divides the first signal into a first portion and a second portion. In FIG. 3, the loss from the first coupler 320 is 0.8 dBm. The first portion of the first signal continues to move through a first duplexer 335 to the first radio antennae 324. The loss becomes −1.3 dBm as the first portion moves through the first duplexer 335. The first portion is then sent by the first antennae 324 out into free space. Indirectly, the first portion of the first signal is then received by the second radio antennae 364 and sent through a second duplexer 345 to a second coupler 360.

The first and second antennas 324 and 364 are located a predetermined distance from one another. There is also a coupling loss between the first antennae 324 and the second antennae 365. The first and second couplers 320 and 360 are adjusted according to that coupling loss. In FIG. 3, there is a 13.4 dB coupling loss between the first radio antennae 324 and the second radio antennae 364. Accordingly, the first and second couplers 320 and 360 are 8 dB directional couplers. This allows the passive interference cancellation system 300 to achieve a 32 dBm isolation between the first and second radios 310 and 350.

The first portion of the first signal passes through the second duplexer 345, and the loss becomes −13.8 dBm. The second portion of the first signal is sent through a first phase shifter 322, which changes the phase of the second portion. As the second portion and first portion of the first signal meet, the portions cancel to achieve a specified isolation between the first radio 310 and the second radio 350. The overall loss of the first signal as the first signal is received by the second radio 350 is −32 dB.

In one embodiment, the second radio 350 transmits a second signal (not shown) to a remote location via the second radio transceiver 355. The second signal is sent through the second coupler 360 that divides the second signal into a first portion and a second portion. The first portion of the second signal continues to move to the second radio antennae 364 and is sent out into free space. Indirectly, the first portion of the second signal is then received by the first radio antennae 324 and sent to the first coupler 320.

The second portion of the second signal is sent through a second phase shifter 362, which changes the phase of the second portion. As the second portion and first portion of the second signal meet, the portions cancel to achieve a specified isolation between the first radio 310 and the second radio 350.

In one embodiment, as seen in FIG. 3, the first radio 310 may be coupled with a third radio 330 so that the first radio 310 and third radio 330 share a common antennae, the first radio antennae 324. These radios would operate at different frequencies. The first radio 310 operates at 2400 MHz and the third radio 330 operates at 800/900 MHz. In alternative embodiments, the first radio 310 and third radio 330 may operate at other frequencies. Since the first radio 310 and third radio 330 operate at different frequencies, a first duplexer 335 is used. A duplexer is a device that isolates the receiver from the transmitter while allowing them to share a common antenna. Here, the duplexer is used as a filtering device that combines two signals of different frequencies onto a common antennae, the first antennae 324.

In one embodiment, as seen in FIG. 3, the second radio 350 may be coupled with a fourth radio 340 so that the second radio 350 and the fourth radio 340 share a common antennae, the second radio antennae 364. These radios 350 and 340 would operate at different frequencies. The second radio 350 operates at 5300 MHz, and the fourth radio 340 may operate on any other frequency. In alternative embodiments, the second radio 350 and fourth radio 340 may operate at other frequencies. A second duplexer 345 is used between the second and fourth radios 350 and 340 to combine the signals from the radios 350 and 340 onto the second radio antennae 364.

Figure 4:
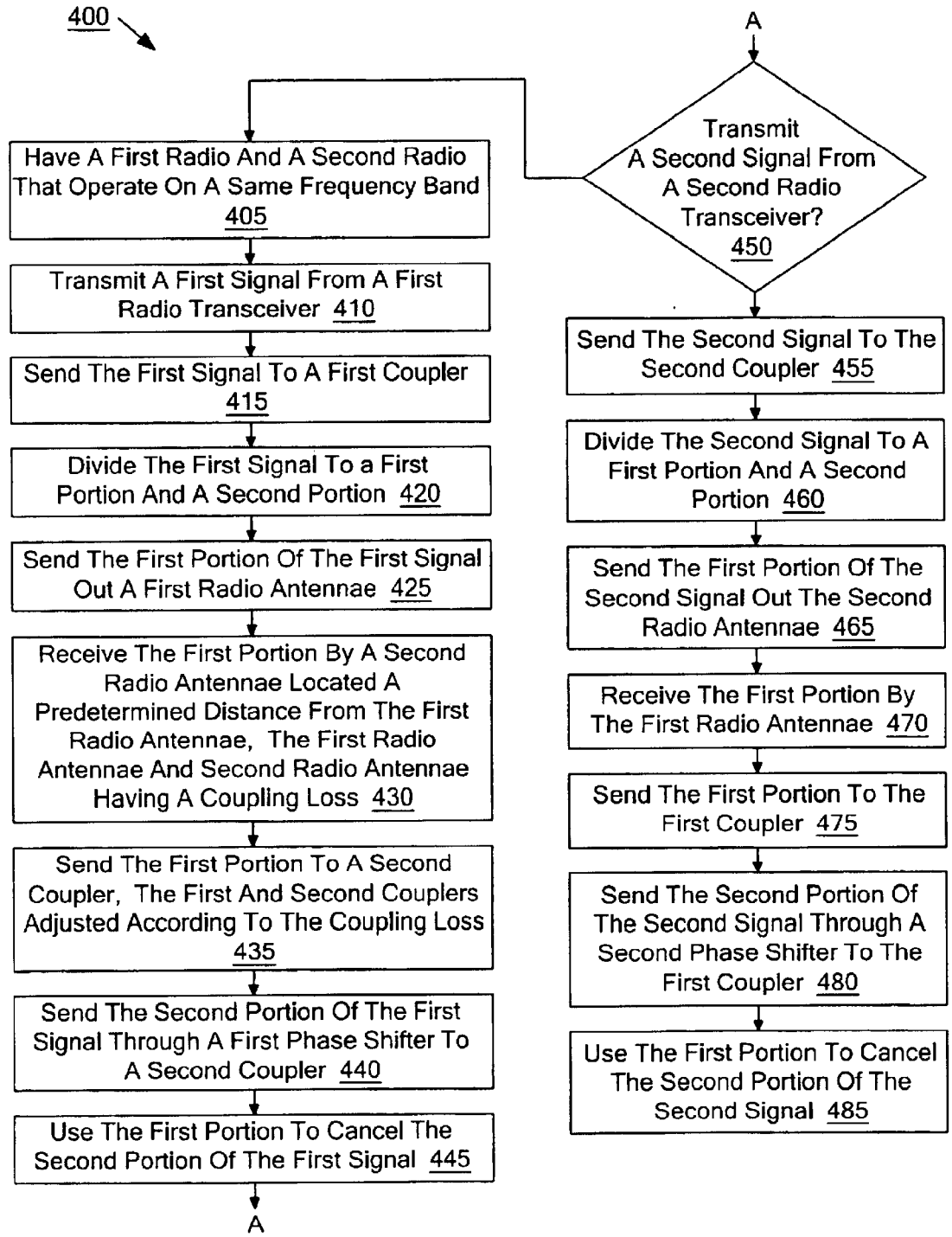
FIG. 4 illustrates a flow diagram of one embodiment of a process for passively canceling interference.

FIG. 4 illustrates a flow diagram of one embodiment of a process 400 of passively canceling interference. At processing block 405, a first radio and a second radio operate on a same frequency band. At processing blocks 410 and 415, a first signal is transmitted from a first radio transceiver and sent to a first coupler. At processing block 420, the first signal is divided into a first portion and a second portion.

The first portion of the first signal is sent out a first radio antennae at processing block 425. At processing block 430, the first portion of the first signal is received by a second radio antennae. The second radio antennae is located a predetermined distance from the first radio antennae. There is a coupling loss between the first and second radio antennas. At processing block 435, the first portion is sent to a second coupler. The first and second couplers are adjusted according to the coupling loss between the first and second radio antennas.

At processing block 440, the second portion of the first signal is sent through a first phase shifter to a second coupler. The first phase shifter shifts the phase of the second portion of the first signal so that, at processing block 445, the second portion of the first signal may be used to cancel the first portion of the first signal.

At processing block 450, it is determined if a second signal is transmitted from a second radio transceiver. If a second signal is not transmitted, the process continues back to processing block 405. The process is a passive interference cancellation process. The transmission of a second signal from the second radio causes interference to the first radio, thereby causing the process to passively cancel the interference to the first radio. Without a second signal transmitted from the second radio, there would be no need for interference cancellation if there is no strong signal that requires interference cancellation. The passive interference cancellation process thus acts to reduce the background noise that may be present.

If a second signal is transmitted, the process continues to processing block 455, and the second signal is sent to the second coupler. At processing block 460, the second signal is divided into a first portion and a second portion. At processing blocks 465 and 470, the first portion of the signal is sent out the second radio antennae and received by the first radio antennae. At processing block 475, the first portion of the second signal is sent to the first coupler. At processing block 480, the second portion of the second signal is sent through a second phase shifter to the first coupler. The first portion of the second signal is then used to cancel the second portion of the second signal at processing block 485.

A method and an apparatus for passive interference cancellation have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
    a first radio having a first radio transceiver and a first radio antennae;
    a second radio having a second radio transceiver and a second radio antennae, the first and second radios operating on a same frequency band, the first radio antennae located a predetermined distance from the second radio antennae, the first and second radio antennas having a coupling loss;
    a first coupler and a second coupler adjusted according to the coupling loss;
    a first phase shifter coupled between the first coupler and second coupler; and
    wherein the first radio transceiver transmits a first signal, the first signal divided by the first coupler to a first portion and a second portion of the first signal, the first portion moving through the first radio antennae and received by the second radio antennae, the second portion moving through the first phase shifter, both portions meeting and canceling to achieve a specified isolation between the first and second radios.

2. The system of claim 1 further comprising a second phase shifter.

3. The system of claim 2 wherein the second phase shifter receives a second portion of a second signal transmitted from the second radio transceiver, the second signal divided by the second coupler to a first portion and a second portion of the second signal, and the first portion moving through the second radio antennae and received by the first radio antennae.

4. The system of claim 1 wherein the predetermined distance between the first radio antennae and the second radio antennae is calculated according to the specified isolation between the first and second radios.

5. The system of claim 1 wherein the specified isolation is 30 decibels.

6. The system of claim 1 wherein the first and second couplers are directional couplers.

7. The system of claim 6 wherein the first and second couplers are 7 decibel directional couplers.

8. The system of claim 1 wherein at least one of the first radio and the second radio operate using a Bluetooth™ communication standard.

9. The system of claim 1 wherein at least one of the first radio and the second radio operate using an IEEE 802.11b communication standard.

10. The system of claim 1 further comprising a third radio sharing the first radio antennae with the first radio via a duplexer.

11. The system of claim 10 wherein at least one of the first radio and the third radios communicate using a Bluetooth™ communication standard.

12. The system of claim 1 further comprising a fourth radio sharing the second radio antennae with the second radio via a duplexer.

13. The system of claim 12 wherein at least one of the second radio and the fourth radio communicate using an IEEE 802.11b communication standard.

14. The system of claim 1 wherein at least one of the first radio and the second radio operate using an IEEE 802.11b communication standard.

15. An apparatus comprising:
a first radio having a first radio transceiver and a first radio antennae;
a second radio having a second radio transceiver and a second radio antennae, the first and second radios operating on a same frequency band, the first radio antennae located a predetermined distance from the second radio antennae and the first and second radio antennas having a coupling loss; and
a first coupler and a second coupler adjusted according to the coupling loss, the first coupler taking a first signal transmitted from the first radio transceiver and sending a first portion of the first signal to the first radio antennae and a second portion of the first signal to a phase shifter, the portions of the first signal meeting and canceling to achieve a specified isolation between the first and second radios, and wherein the second coupler taking a second signal transmitted from the second radio transceiver and sending a first portion of the second signal to the second radio antennae and a second portion of the second signal to a second phase shifter, the portions of the second signal meeting and canceling to achieve the specified isolation.

16. The apparatus of claim 15 wherein the predetermined distance between the first radio antennae and the second radio antennae is calculated according to the specified isolation between the first and second radios.

17. The apparatus of claim 15 wherein the specified isolation is 30 decibels.

18. The apparatus of claim 15 wherein the first and second couplers are directional couplers.

19. The apparatus of claim 18 wherein the first and second couplers are 7 decibel directional couplers.

20. The apparatus of claim 15 wherein at least one of the first radio and the second radio operate using a Bluetooth™ communication standard.

21. The apparatus of claim 15 wherein at least one of the first radio and the second radio operate using an IEEE 802.11b communication standard.

22. The apparatus of claim 15 further comprising a third radio sharing the first radio antennae with the first radio via a duplexer.

23. The apparatus of claim 22 wherein at least one of the first radio and the third radio communicates using a Bluetooth™ communication standard.

24. The apparatus of claim 15 further comprising a fourth radio sharing the second radio antennae with the second radio via a duplexer.

25. The apparatus of claim 24 wherein at least one of the second radio and the fourth radio communicate using an IEEE 802.11b communication standard.

26. A system comprising:
a first radio having a first radio transceiver and a first radio antennae;
a second radio having a second radio transceiver and a second radio antennae, the first and second radios operating on a same frequency band, the first radio antennae located a predetermined distance from the second radio antennae and the first and second radio antennas having a coupling loss; and
a first coupler and a second coupler adjusted according to the coupling loss, the first coupler taking a first signal transmitted from the first radio transceiver and dividing the first signal so that a first portion moves through a first phase shifter and cancels a second portion to achieve a specified isolation between the first and second radios.

27. The system of claim 26 further comprising a second phase shifter wherein the second coupler taking a second signal transmitted from the second radio transceiver and dividing the second signal so that a first portion moves through the second phase shifter and cancels a second portion to achieve the specified isolation between the first and second radios.

28. The system of claim 26 wherein the predetermined distance between the first radio antennae and the second radio antennae is calculated according to the specified isolation between the first and second radios.

29. The system of claim 26 wherein the specified isolation is 30 decibels.

30. The system of claim 26 wherein the first and second couplers are directional couplers.

31. The system of claim 30 wherein the first and second couplers are 7 decibel directional couplers.

32. The system of claim 26 wherein at least one of the first radio and the second radio operate using a Bluetooth™ communication standard.

33. The system of claim 26 further comprising a third radio sharing the first radio antennae with the first radio via a duplexer.

34. The system of claim 33 wherein at least one of the first radio and the third radios communicate using a Bluetooth™ communication standard.

35. The system of claim 26 further comprising a fourth radio sharing the second radio antennae with the second radio via a duplexer.

36. The system of claim 35 wherein at least one of the second radio and the fourth radio communicate using an IEEE 802.11b communication standard.

37. A method comprising:
having a first radio and a second radio that operate on a same frequency band;
transmitting a first signal from a first radio transceiver;
sending the first signal to a first coupler;
dividing the first signal to a first portion and a second portion;
sending the first portion of the first signal out a first radio antennae;

receiving the first portion by a second radio antennae located a predetermined distance from the first radio antennae, the first radio antennae and second radio antennae having a coupling loss;

sending the first portion to a second coupler, the first and second couplers adjusted according to the coupling loss;

sending the second portion of the first signal through a first phase shifter to a second coupler; and achieving a specified isolation between the first and second radios by having the first portion of the first signal cancel the second portion of the first signal.

38. The method of claim 37 further comprising:

transmitting a second signal from a second radio transceiver;

sending the second signal to the second coupler;

dividing the second signal into a first portion and a second portion;

sending the first portion of the second signal out the second radio antennae;

receiving the first portion by the first radio antennae;

sending the first portion to the second coupler;

sending the second portion of the second signal through a second phase shifter to the second coupler; and achieving the specified isolation between the first and second radios by having the first portion of the second signal cancel the second portion of the second signal.

39. The system of claim 37 wherein the predetermined distance between the first radio antennae and the second radio antennae is determined according to the specified isolation between the first and second radios.

40. The system of claim 37 wherein the specified isolation is 30 decibels.

41. The method of claim 37 further comprising filtering communications from and to the first radio and a third radio sharing the first radio antennae using a duplexer.

42. The method of claim 41 wherein the first radio and the third radio communicate using a Bluetooth™ communication standard.

43. The method of claim 38 further comprising filtering communications from the second radio and a fourth radio sharing the second radio antennae using a duplexer.

44. The method of claim 43 wherein the second radio and fourth radio communicate using an IEEE 802.11b communication standard.

45. The system of claim 37 wherein the first and second couplers are directional couplers.

46. The system of claim 45 wherein the first and second couplers are 7 decibel directional couplers.

* * * * *